US012020446B2

(12) United States Patent
Jain et al.

(10) Patent No.: US 12,020,446 B2
(45) Date of Patent: Jun. 25, 2024

(54) OFFSET OBJECT ALIGNMENT OPERATIONS

(71) Applicant: Adobe Inc., San Jose, CA (US)

(72) Inventors: Arushi Jain, Ashok Vihar (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 92 days.

(21) Appl. No.: 17/966,030

(22) Filed: Oct. 14, 2022

(65) Prior Publication Data

US 2024/0127463 A1  Apr. 18, 2024

(51) Int. Cl.
G06T 7/30 (2017.01)
G06T 7/13 (2017.01)
G06T 11/60 (2006.01)
G06F 3/04842 (2022.01)

(52) U.S. Cl.
CPC ............. G06T 7/30 (2017.01); G06T 7/13 (2017.01); G06T 11/60 (2013.01); G06F 3/04842 (2013.01); G06T 2200/24 (2013.01); G06T 2210/12 (2013.01)

(58) Field of Classification Search
CPC ... G06T 7/30; G06T 7/13; G06T 11/60; G06T 2200/24; G06T 2210/12; G06F 3/04842
See application file for complete search history.

(56) References Cited

U.S. PATENT DOCUMENTS

| | | | |
|---|---|---|---|
| 2004/0239691 A1* | 12/2004 | Sprang | G06T 11/60 345/651 |
| 2013/0155069 A1* | 6/2013 | Borders | G06F 3/018 345/441 |
| 2018/0373679 A1* | 12/2018 | Ranjan | G06F 40/103 |
| 2019/0130537 A1* | 5/2019 | Agrawal | G06T 11/40 |
| 2019/0258388 A1* | 8/2019 | Travis | G06F 3/04845 |
| 2021/0096730 A1* | 4/2021 | Greenebaum | G06F 3/04842 |

OTHER PUBLICATIONS

Asente, Paul, et al., "Dynamic Planar Map Illustration", ACM Transactions on Graphics, vol. 26, No. 3 [retrieved Aug. 26, 2022]. Retrieved from the Internet <https://doi.org/10.1145/1276377.1276415>., Jul. 29, 2007, 10 pages.
Dinis, Joao, et al., "A Sweep Line Algorithm for Nearest Neighbour Queries", CCCG [retrieved Aug. 26, 2022]. Retrieved from the Internet <http://nautilus.fc.ul.pt/jd/jd02nearest.pdf>., 2002, 5 Pages.

* cited by examiner

*Primary Examiner* — Phi Hoang
(74) *Attorney, Agent, or Firm* — FIG. 1 Patents

(57) ABSTRACT

Offset object alignment operations are described that support an ability to control alignment operations to aid positioning of an object in relation to at least one other object in a user interface based an offset value. This is performable through identification of objects that overlap along an axis in a user interface and calculation of offset values using these object pairs. Filtering and priority based techniques are also usable as part of calculated an offset value to be used as part of an alignment operation.

20 Claims, 10 Drawing Sheets

Algorithm 1 Offset Calculation

Require: Objects in Artwork $N$

1: procedure OFFSETALLOWED($n_A$, $n_B$)
2:     if boundaries of $n_A$ and $n_B$ overlaps then return true
    return false
3: procedure CALCULATEOFFSET($n_A$, $n_B$) return Minimum distance between bounding box of $n_A$ and $n_B$
4: procedure GETOFFSET(objects in artwork $N$)
5:     $\Delta \leftarrow$ all offset value calculated
6:     for each $n_i$ in $(N)$ do
7:         for each $n_j$ in $(N)$ do
8:             if OFFSETALLOWED($n_i$, $n_j$) then
9:                 $\delta \leftarrow$ CALCULATEOFFSET($n_i$, $n_j$).
10:                 $\Delta \leftarrow$ add $\delta$

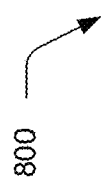

Fig. 8

Algorithm 2 Offset Calculation

Require: Objects in Artwork $N$

1: procedure GETOFFSET(objects in artwork $N$, $\Delta$, $n_A$)
2:     $\Delta$ contains dynamic offset value in sorted manner.
3:     $n \leftarrow$ array of objects allowed for offset snapping
4:     for each $n_i$ in $(N)$ do
5:         if OFFSETALLOWED($n_i$, $n_A$) then
6:             push CALCULATEOFFSET($n_i$, $n_A$) in $n$
7:     sort $n$ along x direction
8:     Search in $\Delta$ for any entry with $\epsilon$   ▷ Searching common element in two arrays can be done in $O(n)$   ▷ $\epsilon$ is snapping tolerance
9:     adjust position of $n$ based on snapping offset

Fig. 9

OFFSET OBJECT ALIGNMENT OPERATIONS

BACKGROUND

Digital images are configurable to include a multitude of different objects having a variety of configurations. Examples of these configurations include vector objects, raster objects, and so forth. Consequently, digital image editing systems are confronted with a variety of challenges to address this complexity to aid arrangement of the multitude of objects within the digital images.

Alignment and spacing of objects are some of the most fundamental principles of visual perception as these convey relationships of the objects to each other. Accordingly, functionality has been developed for implementation by digital image editing systems to assist in alignment and spacing. However, conventional techniques to do so suffer from numerous challenges that limit accuracy and applicability of these conventional techniques due to the ever-increasing complexity of digital images.

SUMMARY

Offset object alignment operations are described that support an ability to control alignment operations to aid positioning of an object in relation to at least one other object in a user interface based an offset value. This is performable through identification of objects that overlap along an axis in a user interface and calculation of offset values using these object pairs. Filtering and priority based techniques are also usable as part of calculated an offset value to be used as part of an alignment operation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 8 depicts a first algorithm usable to perform offset calculation.

FIG. 9 depicts a second algorithm usable to perform offset calculation.

DETAILED DESCRIPTION

Overview

Figure 1:
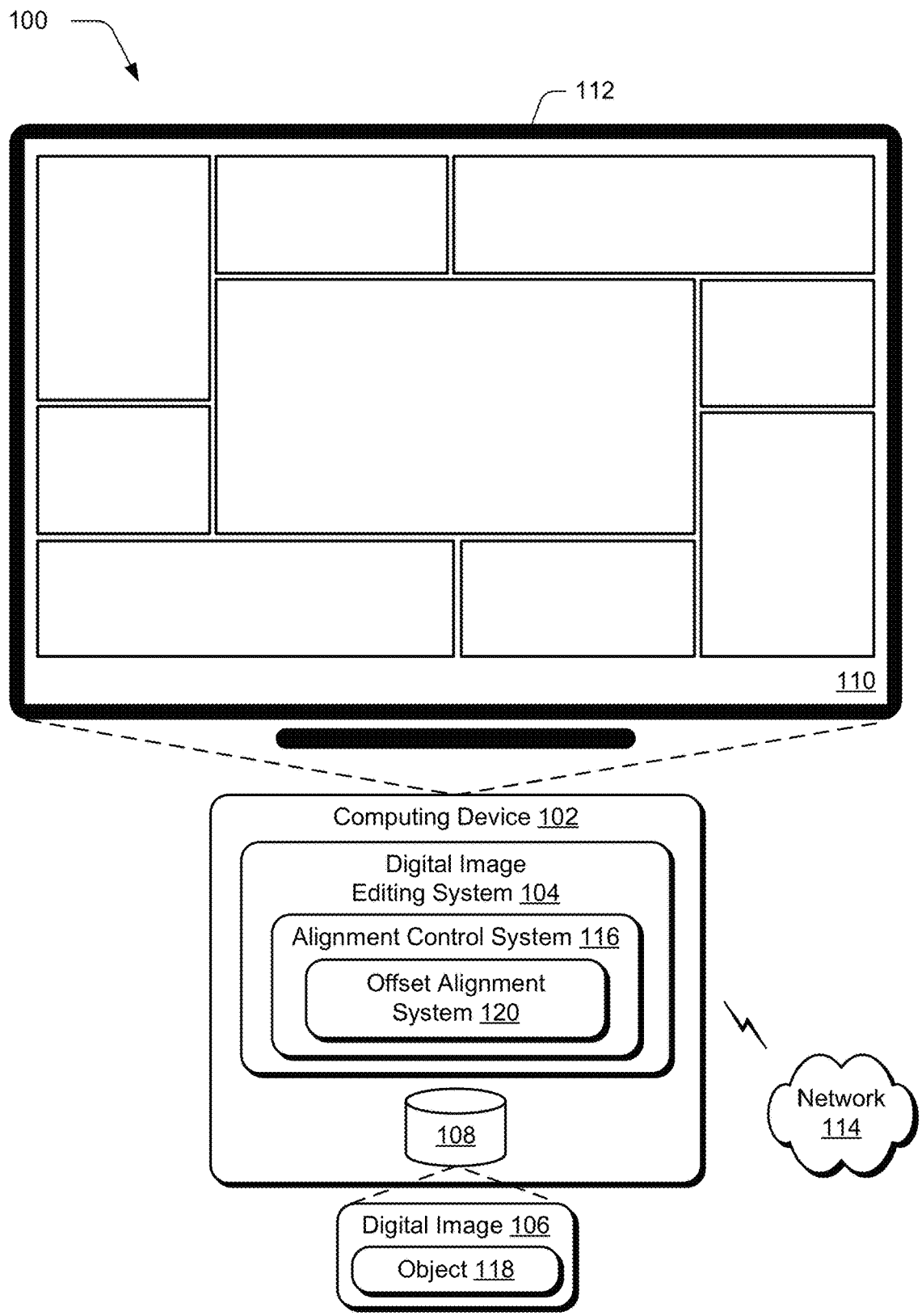
FIG. 1 depicts an example of offset object alignment as implemented in a digital image editing environment.

Conventional techniques used to aid positioning and alignment of objects as part of creating and editing a digital image often fail for their intended purpose. This is often the case because conventional techniques can become oversaturated due to a complexity and multitude of objects included in a digital image. Consider a scenario in which an alignment operation is to be used to aid alignment between objects in a digital image. Oftentimes, objects are arranged in a digital image according to complex patterns, as is typical in collages, webpages, and so forth. An infographic, for instance, is configurable using a plurality of square boxes that are diagonally aligned with respect to each other. Accordingly, conventional techniques used to aid alignment of these objects often fail in these complex scenarios. This hinders operation of a digital image editing system and devices that implement these systems. Further, this challenge is compounded in instances involving a multitude of objects within the digital image.

To address these challenges, offset object alignment operations are described. These techniques support an ability to control alignment operations to aid positioning of an object (e.g., through use of visual guides or snapping operations) in relation to at least one other object in a user interface based an offset value. As a result, these techniques overcome conventional challenges that are limited to manual processes involving visual approximations or multi-step processes involving manual offset measurements made using a digital ruler which are then followed by subsequent placement of a guide at a position to place an object.

In one example, an object input is received by an offset alignment system via a user interface involving an input object. The object input, for instance, includes selection of an input object and subsequent movement of the input object in the user interface. A variety of input types are supported, examples of which include use of a cursor control device (e.g., a click-and-drag operation), a gesture (e.g., a tap-and-hold gesture) detected using touchscreen functionality, and so forth.

In response, an offset value is calculated by the offset alignment system that is to be used as a basis to control performance of an alignment operation, e.g., to output visual guides, implement snapping behavior, and so on. To do so, a set of overlapping objects are identified by the offset alignment system from a plurality of objects in the user interface that have boundaries that overlap.

If an object pair has boundaries that overlap in a direction along a first axis, an offset value is then calculated by the offset alignment system for that object pair along a second axis. For example, two objects that have boundaries that overlap along a Y-axis are then utilized for calculation of a corresponding offset value along an X-axis, e.g., as a distance between the objects in the X-axis. Similar techniques are performable by the offset alignment system for overlaps in the X-axis that are used for calculation of corresponding offset values along the Y-axis.

Filtering is also usable by the offset alignment system as part of calculating offset values between pairs of objects to reduce computational resource consumption and improve processing efficiency by the offset alignment system. The filtering, for instance, is performable to exclude open paths, e.g., lines, although other examples are also contemplated in which open paths are utilized. In another instance, a threshold is defined using a ratio based on an area of a respective said object and an area of a bounding box of the respective said object within the digital image. In yet another instance, the threshold is based on a standard deviation of a distance between sampled points of respective objects that have boundaries that overlap. In a further instance, offset values greater than a threshold distance are removed from further processing, e.g., as it is unlikely that an offset amount greater than this distance is relevant.

The offset alignment system is also configurable to generate a priority to prioritize the offset values calculated for respective object pairs. This is performable using a variety of different parameters. In a first example, cardinality is utilized to define priority of the offset values based on "how common" the offset values are between object pairs in the digital image. To do so, a number of the plurality of objects that have a respective offset value is used as a respective weight to determine the offset values. In a second example, visual saliency as a measure of visual importance of the objects in the object pairs in the digital image is used to assign priority to a respective offset value. In a third example, relative visual saliency is used as a measure of a relative difference in area of the respective pairs in the set of overlapping objects. A variety of other examples are also contemplated.

The offset value, once calculated, is then used as a basis to control alignment operations. Alignment operations are also configurable to implement a variety of functionality. In one example, offset snapping operations are implemented in which an input object is repositioned at a distance from another object in the user interface based on the offset value. In another example, offset alignment guide operations are implemented in which visual guides are output as indicating a distance of the offset value between the input object and another object, e.g., when within a threshold distance of the other object. In this way, user and operational efficiency is improved that overcome conventional challenges.

In an implementation, calculation of the offset value is optimized to improve computational efficiency. This is performable by improving identification of overlapping objects. To do so, objects are sorted by the offset alignment system in a direction along an axis, e.g., direction along an X-axis or Y-axis. A line sweep technique is then employed to generate a series of events based on extremes of the objects, e.g., top and bottom or left and right. For an X-axis, for instance, a direction of left-to-right is used to proceed through the digital image and add events to an array in an order of encountering a left and then a right side of respective objects. Overlaps are then detectable by the offset alignment system based on events from other objects that are disposed between events of a particular object. As a result, processing complexity is reduced from "$O(n^2)$" using this asymptotic approach of "$O(\log n)$" to find nodes and "$O(n*K+n*\log k)$," where "k" is a number of overlapping objects. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ offset object alignment operation techniques as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 11.

The computing device 102 is illustrated as including a digital image editing system 104. The digital image editing system 104 is implemented at least partially in hardware of the computing device 102 to process and transform a digital image 106, which is illustrated as maintained in a storage device 108 (e.g., a computer-readable storage medium) of the computing device 102. Such processing includes creation of the digital image 106, modification of the digital image 106, and rendering of the digital image 106 in a user interface 110 for output, e.g., by a display device 112. Digital images 106 include any form of visual presentation that is capable of being rendered for display in the user interface 110, e.g., raster images, vector objects, and so forth. Although illustrated as implemented locally at the computing device 102, functionality of the digital image editing system 104 is also configurable in whole or in part via functionality available via the network 114, such as part of a web service or "in the cloud."

An example of functionality incorporated by the digital image editing system 104 to process the image 106 is illustrated as an alignment control system 116. The alignment control system 116 is configured to control operations involving location and arrangement of objects 118 within the digital image 106. Objects 118 are also configurable in a variety of ways, examples of which include vector objects, raster objects, or any other object that is capable of being rendered as part of the digital image 106 in the user interface 110 by the display device 112.

The alignment control system 116 includes an offset alignment system 120. The offset alignment system 120 is configured to control alignment operations based on an offset value. The offset value defines a distance to be used by the offset alignment system to space objects 118 in the digital image 106, one from another. In the illustrated user interface 110, for instance, a plurality of objects is depicted as representing artwork in a collage in which each of the objects is arranged as offset from each other by an offset amount. As previously described, conventional techniques rely on manual manipulation typically involving multistep processes, which is inefficient and inaccurate. In the techniques described herein, however, the offset alignment system 120 is configured to utilize an offset amount to control alignment operations, automatically and without user intervention, as an aid to object alignment and positioning. In this way, the alignment operation has increased accuracy and improves computing device operation. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Offset Object Alignment Operations

Figure 10:
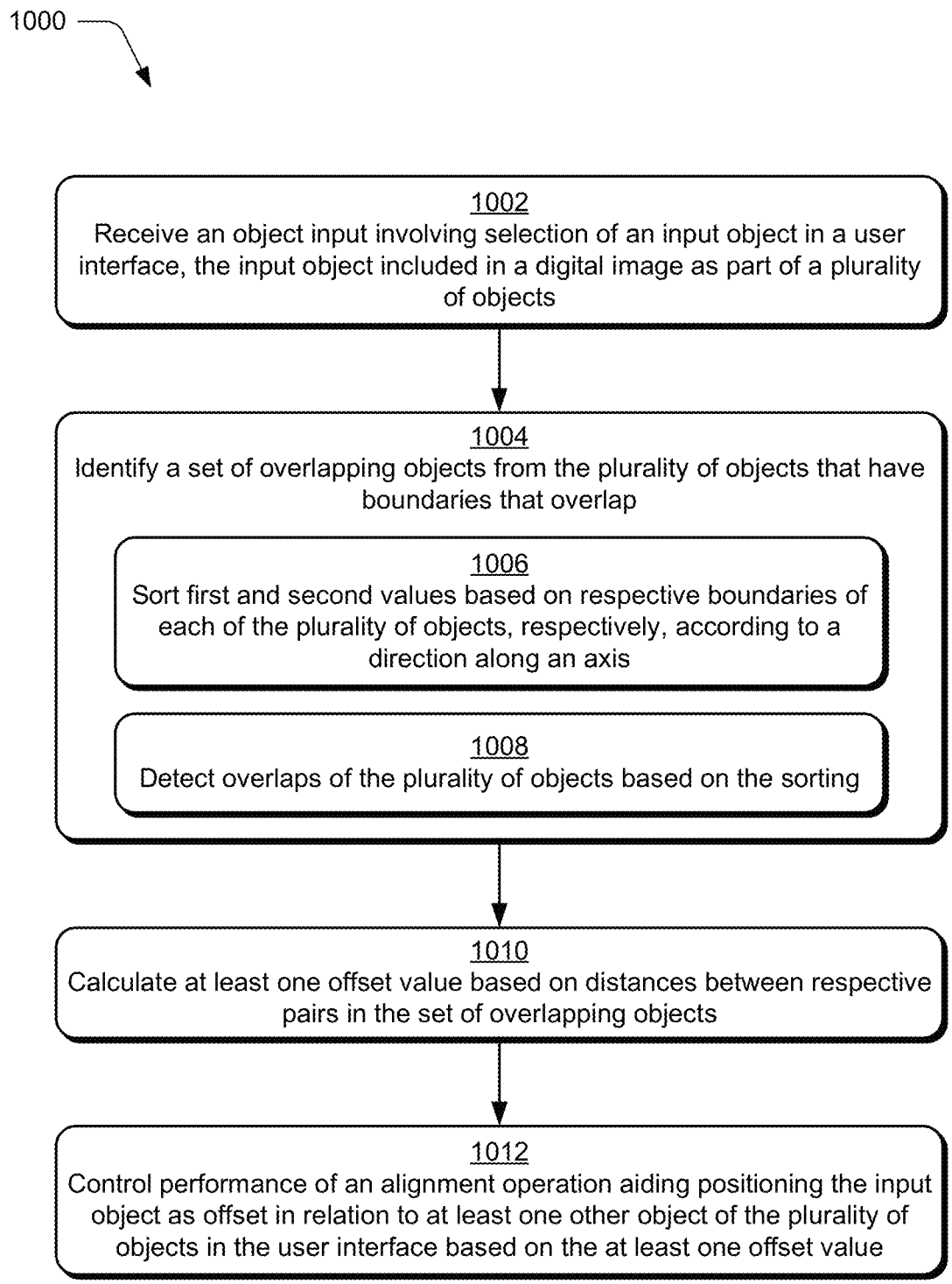
FIG. 10 is a flow diagram depicting a procedure in an example implementation of offset object alignment operations.

The following discussion describes location operation conflict resolution techniques that are implementable utilizing the previously described systems and devices. Aspects of each of the procedures are implemented in hardware, firmware, software, or a combination thereof. The procedure is shown as a set of blocks that specify operations performed by one or more devices and are not necessarily limited to the orders shown for performing the operations by the respective blocks. In the following discussion, reference to a procedure 1000 of FIG. 10 is made in parallel with a discussion of FIGS. 2-9.

Figure 2:
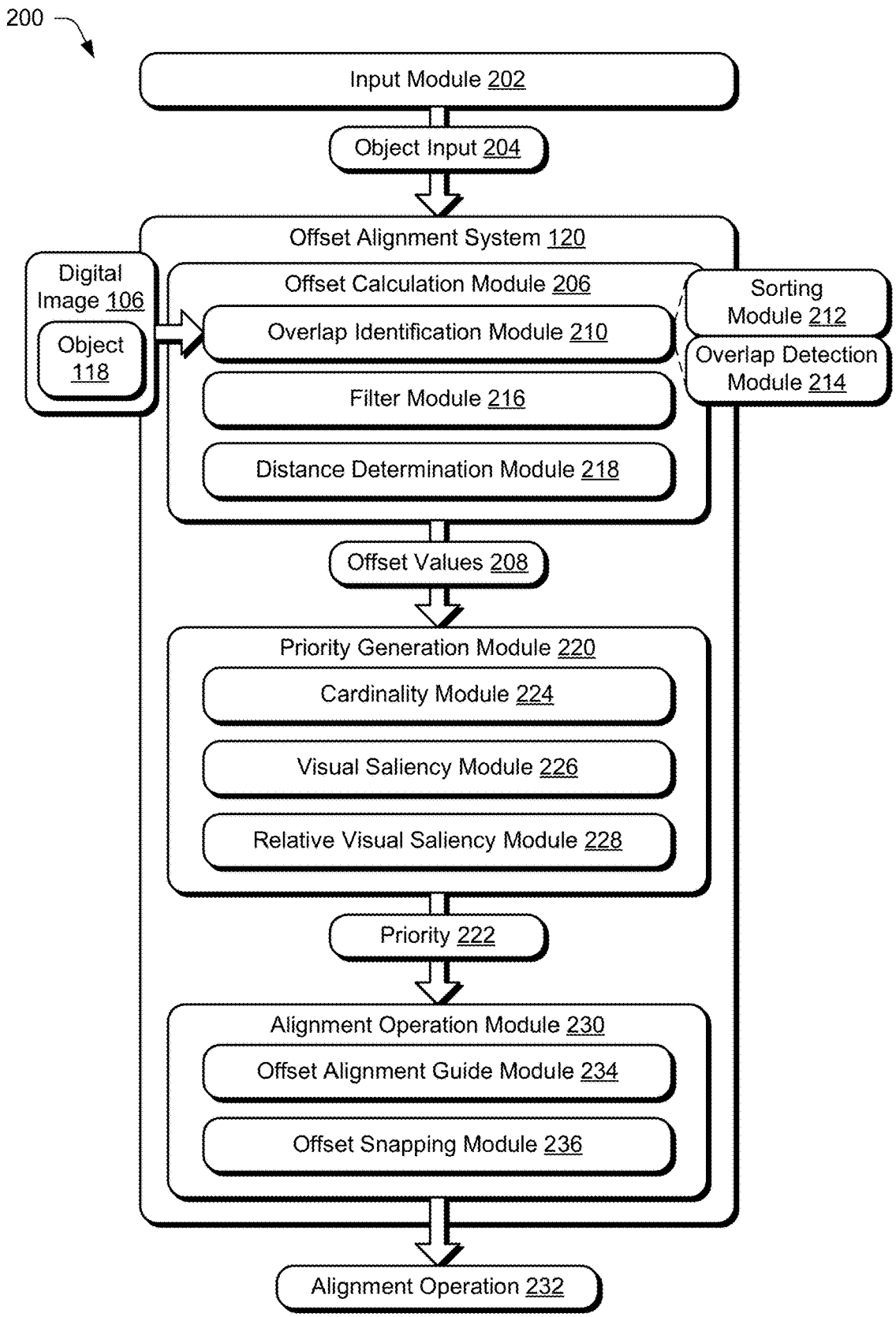
FIG. 2 depicts a system in an example implementation showing operation of an offset alignment system of FIG. 1 in greater detail.

FIG. 2 depicts a system 200 in an example implementation showing operation of the offset alignment system 120 of FIG. 1 in greater detail. To begin in this example, an input module 202 receives an object input 204 involving selection of an input object in a user interface 110. The input object is included in a digital image having a plurality of objects (block 1002). The object input 204, for instance, involves selection and movement of an object in the user interface 110, which is detected through use of a cursor control device, gesture, and so on. In another example, the object input 204 is selectable as a representation of a command, e.g., to utilize offset spacing for a selected object. A variety of other examples are also contemplated. The object input 204 is then provided to the offset alignment system 120 to manage positioning of the input object with respect to at least one other object in the user interface through use of an offset.

The offset alignment system 120 first employs an offset calculation module 206 to calculate offset values 208. Other examples are also contemplated, such as to set the offset value 208 based on a user input entered via the user interface 110. To calculate the values, an overlap identification module 210 is utilized to identify a set of overlapping objects from the plurality of objects that have boundaries that overlap (block 1004). To do so, the overlap identification module 210 first detects each of the objects and locations (e.g., coordinates) of those objects within the digital image 106.

Boundary boxes are then formed for each of the objects based on extremes of coordinates of the respective objects along a plurality of axes, e.g., X and Y axes. If two object boundaries overlap along a Y axis, then these objects are added as candidates for use in determining an offset value along an X-axis. Similar functionality is employed for object boundaries that overlap along an X-axis, which are used as candidates for determining an offset value along a Y-axis. This is performable in a variety of ways, an example of which is described in greater detail in relation to FIGS. 3-5 through use of a sorting module 212 and an overlap detection module 214.

In an implementation, a filter module 216 is utilized to filter candidate objects, which is usable to improve processing efficiency and accuracy. As part of this, a plurality of parameters is usable by the filter mode 216. In a first example, open paths are not considered, which is configured as a strict version of filtering. In an alternative configuration, a ratio is used based on an area defined by a respective object (e.g., a closed or open path) in relation to an area of an overall bounding box of the object within a digital image. In another example, the parameter is based on a standard deviation of a distance between sampled points of respective objects that have boundaries that overlap. In a further example, offset values beyond a threshold distance are removed by a distance determination module 218, i.e., filtered out, as having a decreased likelihood of relevance to a desired offset for the input object.

The offset values 208 are then processed by a priority generation module 220 to assign a priority 222 to the respective values. This is also performable by the priority generation module 220 using a variety of different parameters, functionality of which is represented using a cardinality module 224, a visual saliency module 226, and a relative visual saliency module 228.

The cardinality module 224 is configured to assign a priority based on a number of objects associated with a respective offset value. In other words, Cardinal "Cs," is a number of objects in a listing of object pairs that are at a given offset value:

$$C_{\delta_i} = (n(\Delta_i))$$

The visual saliency module 226 is configured to assign a priority based on a visual saliency of respective objects, e.g., in an object pair. As such, visual saliency "$v_{\delta_i}$" denotes a visual importance of respective objects involved in an offset determination. In order to calculate visual saliency, an area is calculated of each of the objects in a planar arrangement of objects corresponding to "$\Sigma_{t_i}$", e.g., in pixels. Area "A" of objects corresponding to "$\Sigma_{t_i}$" is calculated as follows:

$$V_{\delta_i} = \left(\sum_{i=1}^{|F|} \text{Area}_{F_i}\right)$$

The relative visual saliency module 228 is configured to assign a priority based on a relative visual salience "$R_{\delta_i}$." This is calculated as a relative difference in areas of objects involved in an offset calculation, i.e., in a respective pair in a set of overlapping objects. This is usable to reduce placement of two unrelated objects in the vicinity of each other. A maximum value of relative visual salience is stored along with the object pairs placed at offset value "$\delta_i$".

The offset value "$\delta_i$" is computed as a weighted linear combination of normalized and/or regularized parameters of cardinal "$C_{\delta_i}$" visual salience "$v_{\delta_i}$" and relative visual salience "$R_{\delta_i}$" as follows:

$$\omega_p = (w_C * C_{\delta_i} + w_V * V_{\delta_i} + w_R * R_{\delta_i})$$

where "$w_c$," "$w_v$," and "$w_R$" are weights defining relative importance of respective values in the offset value calculation in order to arrive at the priority 222. Additional example depictions of algorithms usable by the offset calculation include Algorithm One 800 of FIG. 8 and Algorithm Two 900 of FIG. 9.

The priority 222 is then passed as an input to an alignment operation module 230 to control performance of an alignment operation 232 involving object offsets. The priority, for instance, is usable to calculate at least one offset value based on distances between respective pair in the set of overlapping objects (block 1010) that is to be used by an alignment operation module 230. The alignment operation module 230 then control performance of an alignment operation that is configured to aid positioning of the input object as offset in relation to at least one other object of the plurality of objects in the user interface based on the at least one offset value (block 1012).

Examples of functionality to do so include an offset alignment guide module 234 and an offset snapping module 236. The offset alignment guide module 234 supports output of visual guides indicating the offset distance with respect to the other object in the user interface. An example of which is described in greater detail in an example implementation 600 of FIG. 6. In this example, an object input is detected via a user interface involving an input object 602, e.g., as a select-and-drag gesture 604. Upon positioning of the input object 602 within a threshold distance of other objects in the user interface, visual guides 606, 608, 610, 612 are output indicating an offset and corresponding offset value.

The offset snapping module 234 is usable separately or in conjunction with the offset snapping module 234 to perform a snapping operation in which the input object is repositioned (automatically and without user intervention) at an offset value with respect to another object in the user interface. An example of which is described in greater detail in an example implementation 700 of FIG. 7. In this example, a gesture 702 is used to select and move an object in a user interface 110. Once an object is positioned at a first location 704(1) that is within a threshold distance of an offset value, the object is automatically repositioned to a second location 704(2) corresponding to the offset value. A variety of other examples are also contemplated.

As described above, some approaches to overlap detection have a processing complexity "$O(n^2)$" which consumes a significant amount of computational resources. In order to improve device operation, a sorting module 212 and overlap detection module 214 of the overlap identification module 210 support an asymptotic approach of processing complexity of "$O(\log n)$" to find nodes and "$O(n*K+n*\log k)$," where "k" is the asymptotic number of overlapped objects to be considered for offset calculation.

Figure 3:
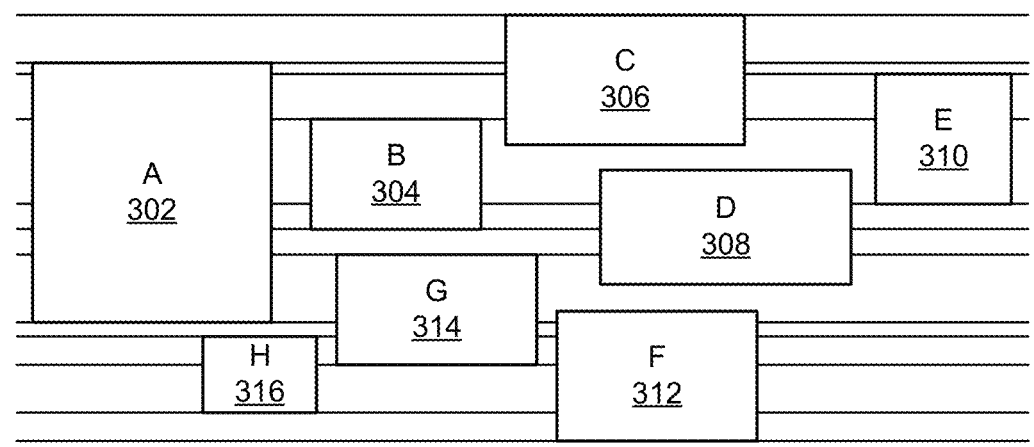
FIG. 3 depicts an example implementation of objects and respective overlaps in a digital image.

FIG. 3 depicts an example implementation 300 of objects and respective overlaps in a digital image 106. In this example, an offset value is calculated of a direction along an X axis for an "A" object 302, "B" object 304, "C" object 306, "D" object 308, "E" object 310, "F" object 312, "G" object 314, and "H" object 316.

First, the sorting module 212 is employed to sort first and second values based on boundaries of each of the plurality of objects, respectively, according to a direction along an axis (block 1006). The overlap detection module 214 is then utilized to detect overlaps of the plurality of objects based on the sorting (block 1008). This is performed using a line sweep algorithm using first and second values (i.e., events) that define extremes of respective boundaries of each of the plurality of object according to the direction along the axis.

In the illustrated example, these values define a top "$t_i$" and bottom "$b_i$" of objects as the events detected in the line sweep. Accordingly, a particular object overlaps the source object that has a top "$t_i$" and/or bottom "$b_i$" event that falls between events top "$t_s$" and/or bottom "$b_s$" of a source object. In some instances, the particular object is completely contained within the corresponding object. For that particular object "$t_x$," events happen before "$t_s$" and bottom "$b_x$" happens after "$b_s$." Since offset is commutative, this offset is computable while considering object "x."

Figure 4:
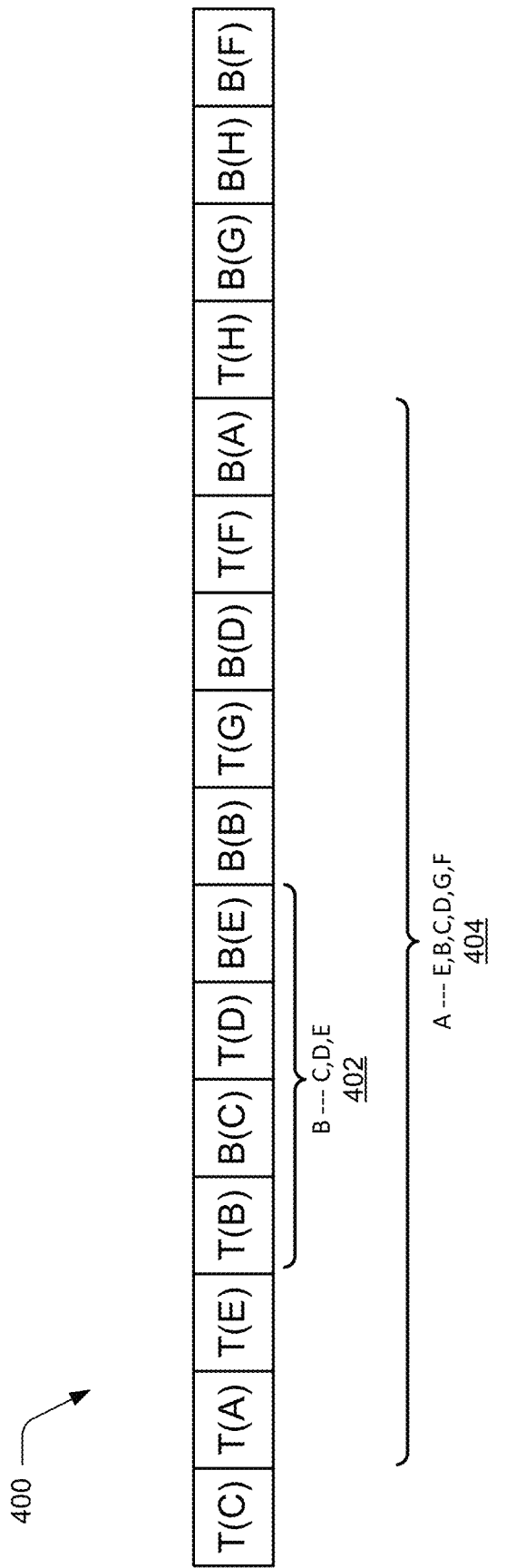
FIG. 4 depicts an example implementation of line sweep events calculated based on use of a line sweep technique for the objects of FIG. 3.

FIG. 4 depicts an example implementation 400 of line sweep events calculated based on use of a line sweep technique for the objects of FIG. 3. "T(i)" is used to represent a top event for object "i" whereas "B(i)" correspond to a bottom event of object "i." Between "T(B)" and "B(B)" 402 each object overlapping with "B" is covered except "A." However, an offset between "A" and "B" 404 is covered while processing "A." In this way, event positioning is usable by the overlap identification module 210 to efficiently identify overlaps and improve device operation.

Figure 5:
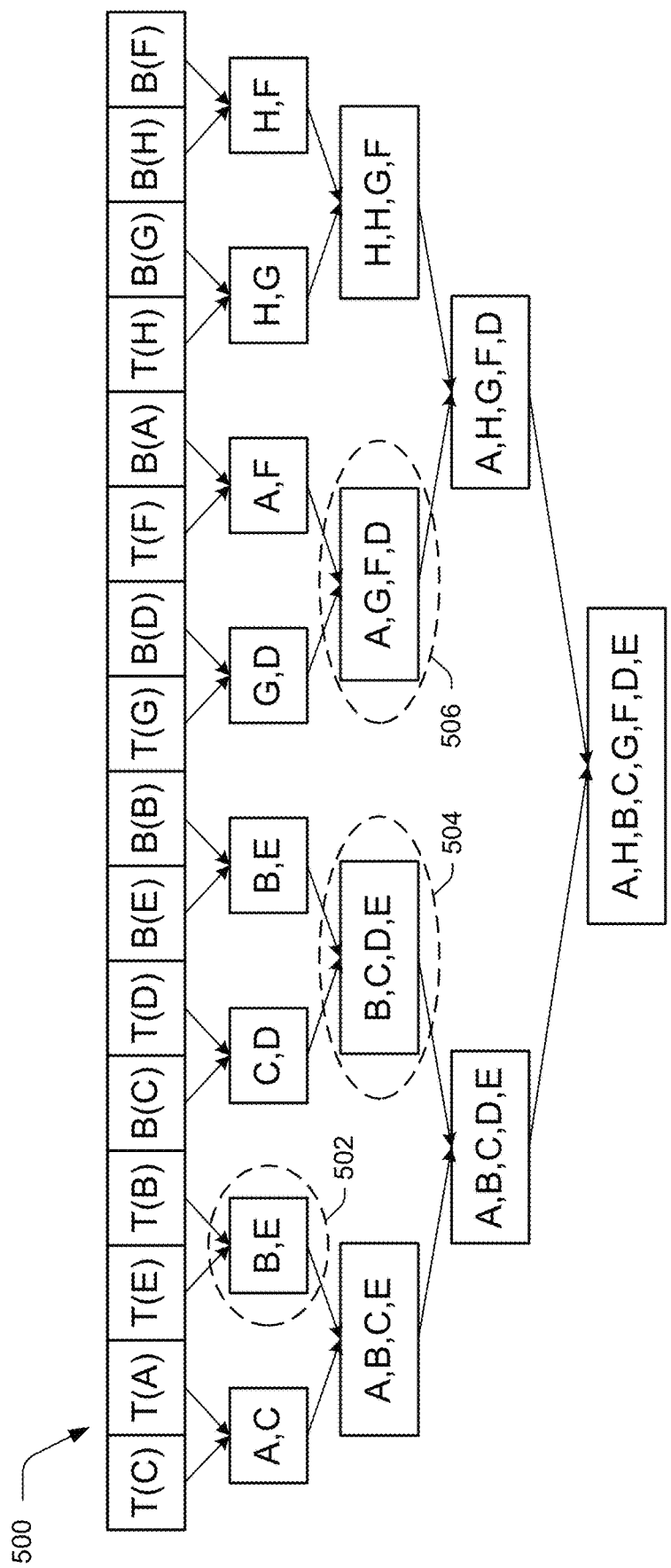
FIG. 5 depicts another example implementation of threshold offset calculation.
Figure 6:
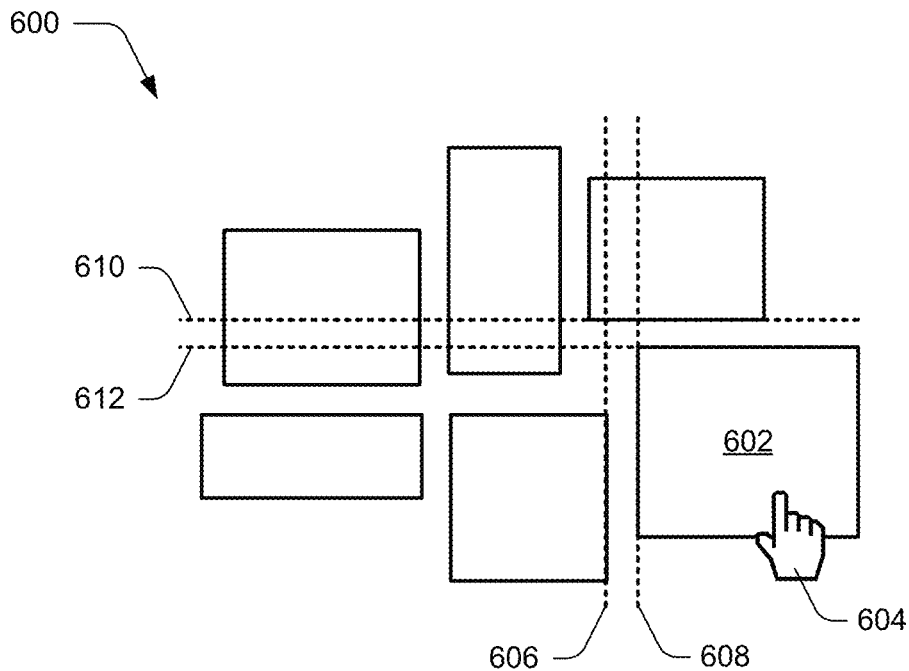
FIG. 6 depicts an example implementation of an alignment operation using visual guides.
Figure 7:
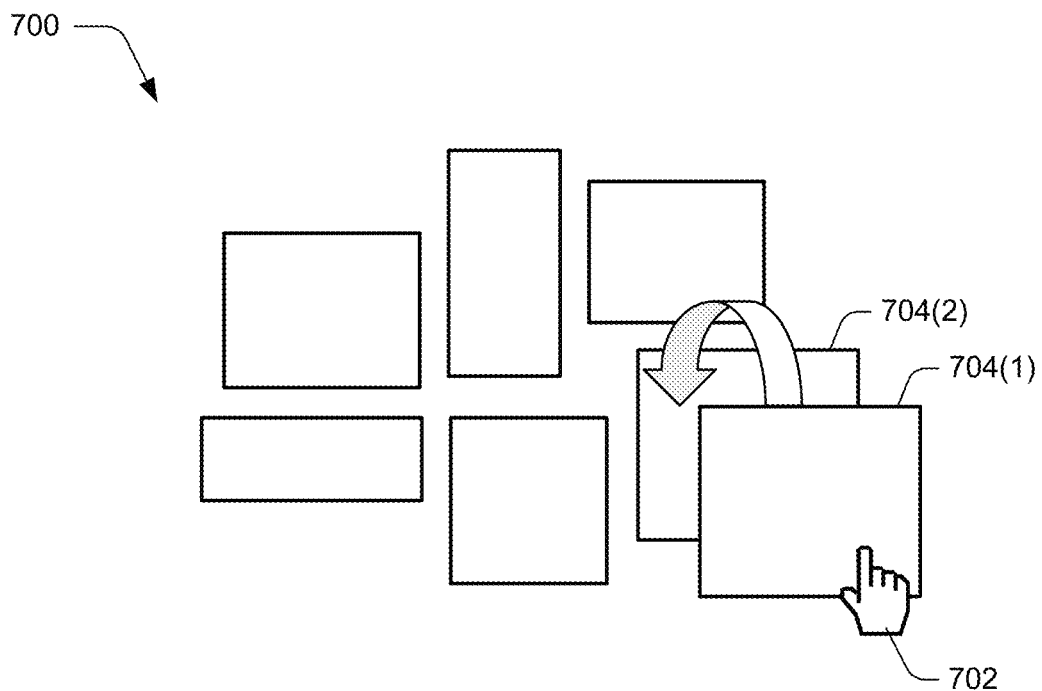
FIG. 7 depicts an example implementation of an alignment operation including a snapping operation.

FIG. 5 depicts another example implementation 500 of threshold offset calculation. In some scenarios where offset calculation is not performed beyond a threshold distance (e.g., as described for the distance determination module 218), instead of calculating the offset for each overlapped object, the offset is calculated for qualifying objects.

Figure 11:
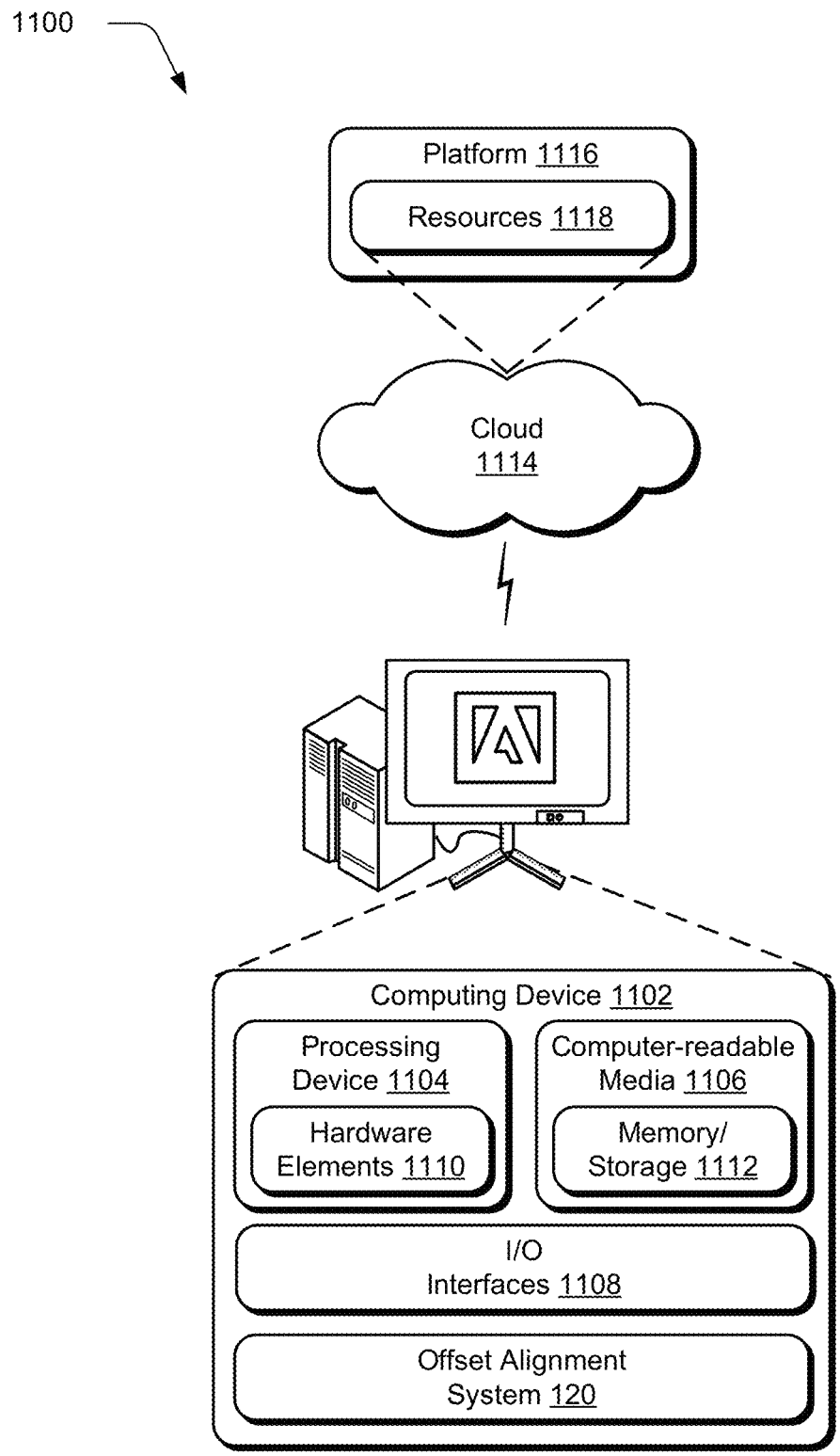
FIG. 11 illustrates an example system including various components of an example device that can be implemented as any type of computing device as described and/or utilize with reference to FIGS. 1-10 to implement embodiments of the techniques described herein.

To do so, line sweep events in an array are sorted using a merge sort, which is based on left and right boundaries of the objects in this example. Intermediate nodes 502, 504, 506 of the merge sort are preserved, which are also stored. This creates a balanced and complete binary search tree. To identify the qualifying overlapping objects along an axis (e.g., X-axis in the illustrated example), the nodes are searched, which identify nodes 502, 504, 506 as specifying overlapping objects. As a result, processing efficiency and device operation is improved. Example System and Device FIG. 11 illustrates an example system generally at 1100 that includes an example computing device 1102 that is representative of one or more computing systems and/or devices that implement the various techniques described herein. This is illustrated through inclusion of the offset alignment system 120. The computing device 1102 is configurable, for example, as a server of a service provider, a device associated with a client (e.g., a client device), an on-chip system, and/or any other suitable computing device or computing system.

The example computing device 1102 as illustrated includes a processing device 1104, one or more computer-readable media 1106, and one or more I/O interface 1108 that are communicatively coupled, one to another. Although not shown, the computing device 1102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1104 is representative of functionality to perform one or more operations using hardware. Accordingly, the processing device 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) that causes the processing device to perform operations in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing device 1104. The instructions and/or functions are executable/operable by one or more articles of manufacture (for example, one or more computing devices 1102 and/or processing devices 1104) to implement techniques, modules, and examples described herein.

The techniques described herein are supported by various configurations of the computing device 1102 and are not limited to the specific examples of the techniques described herein. This functionality is also implementable all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

In implementations, the platform 1116 employs a "machine-learning model," which refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, an object input involving selection of an input object in a user interface, the input object included in a digital image as part of a plurality of objects;
   identifying, by the processing device, a set of overlapping objects from the plurality of objects that have boundaries that overlap;
   calculating, by the processing device, at least one offset value based on distances between respective pairs in the set of overlapping objects; and
   controlling, by the processing device, performance of an alignment operation aiding positioning the input object as offset in relation to at least one other object of the plurality of objects in the user interface based on the at least one offset value.

2. The method as described in claim 1, wherein:
   the identifying includes detecting the boundaries that overlap along a first axis; and
   the calculating of the least one offset value is based on a respective said distance along a second axis.

3. The method as described in claim 1, wherein the identifying the set of overlapping objects includes:
   sorting first and second values based on respective said boundaries of each of the plurality of objects, respectively, according to a direction along an axis;
   detecting overlaps of the plurality of objects based on the sorting.

4. The method as described in claim 3, wherein:
   the first and second values define extremes of the respective said boundaries of each of the plurality of object according to the direction along the axis; and
   the sorting is performed using a line sweeping technique.

5. The method as described in claim 1, wherein the calculating includes filtering the set of overlapping objects based on a threshold.

6. The method as described in claim 5, wherein the threshold is defined using a ratio based on an area of a respective said object and an area of a bounding box of the respective said object within the digital image.

7. The method as described in claim 5, wherein the threshold is based on a standard deviation of a distance between sampled points of respective said objects that have boundaries that overlap.

8. The method as described in claim 1, wherein the calculating is performed for a plurality of said offset values, further comprising generating a priority of the plurality of said offset values, and wherein the controlling is based at least in part on the priority.

9. The method as described in claim 8, wherein the priority is based on a number of the plurality of objects that have a respective said offset value.

10. The method as described in claim 8, wherein the priority is based on visual saliency of respective said objects.

11. The method as described in claim 8, wherein the priority is based on a relative difference in area of respective said objects in a respective said pair in the set of overlapping objects.

12. A system comprising:
    an overlap identification module implemented by a processing device to identify a set of overlapping objects from a plurality of objects that have boundaries that overlap in a digital image;
    a distance determination module implemented by the processing device to calculate a plurality of offset values based on distances between respective pairs in the set of overlapping objects;
    a priority generation module implemented by the processing device to generate a priority for the plurality of offset values; and
    an alignment operation module implemented by the processing device to control performance of an alignment operation, the alignment operation aiding positioning an object as offset in relation to at least one other object of the plurality of objects in a user interface based on the priority for the plurality of offset values.

13. The system as described in claim 12, wherein the priority is based on:
    a number of the plurality of objects that have a respective said offset value;
    visual saliency of respective said objects; or
    a relative difference in area of respective said objects in a respective said pair in the set of overlapping objects.

14. The system as described in claim 12, wherein the overlap identification module includes:
- a sorting module configured to sort first and second values based on respective said boundaries of each of the plurality of objects, respectively, according to a direction along an axis;
- an overlap detection module configured to detect overlaps of the plurality of objects based on the sorting.

15. The system as described in claim 14, wherein the first and second values define extremes of the respective said boundaries of each of the plurality of object according to the direction along the axis.

16. The system as described in claim 12, wherein the offset calculation module includes a filter module configured to filter the set of overlapping objects based on a threshold, the threshold:
- defined using a ratio based on an area of a respective said object and an area of a bounding box of the respective said object within the digital image; or
- based on a standard deviation of a distance between sampled points of respective said objects that have boundaries that overlap.

17. The system as described in claim 12, wherein the priority is based on:
- a number of the plurality of objects that have a respective said offset value;
- visual saliency of respective said objects; or
- a relative difference in area of the respective pairs in the set of overlapping objects.

18. One-or-more computer-readable storage media storing instructions that, responsive to execution by a processing device, causes the processing device to perform operations including:
- receiving an object input involving selection of an input object in a user interface;
- identifying a set of overlapping objects from a plurality of objects that have boundaries that overlap in a user interface;
- calculating at least one offset value based on distances between respective pairs in the set of overlapping objects; and
- aiding positioning the input object as offset in relation to at least one other object of the plurality of objects in the user interface based on the at least one offset value.

19. The one-or-more computer-readable storage media as described in claim 18, wherein the identifying the set of overlapping objects includes:
- sorting first and second values based on respective said boundaries of each of the plurality of objects, respectively, according to a direction along an axis;
- detecting overlaps of the plurality of objects based on the sorting.

20. The one-or-more computer-readable storage media as described in claim 19, wherein the first and second values define extremes of the respective said boundaries of each of the plurality of object according to the direction along the axis and the sorting is performed using line sweeping.

* * * * *